(12) United States Patent
Rusch

(10) Patent No.: US 9,885,882 B2
(45) Date of Patent: Feb. 6, 2018

(54) PROGRESSIVE CONTACT LENS

(71) Applicant: DIVERSIFIED OPHTHALMICS INC., Cincinnati, OH (US)

(72) Inventor: David Rusch, Punta Gorda, FL (US)

(73) Assignee: Diversified Ophthalmics, Inc., Cincinnati, OH (US)

( * ) Notice: Subject to any disclaimer, the term of this patent is extended or adjusted under 35 U.S.C. 154(b) by 0 days.

(21) Appl. No.: 15/379,799

(22) Filed: Dec. 15, 2016

(65) Prior Publication Data

US 2017/0219847 A1    Aug. 3, 2017

Related U.S. Application Data

(60) Provisional application No. 62/290,909, filed on Feb. 3, 2016.

(51) Int. Cl.
   *G02C 7/04* (2006.01)
   *G02C 7/06* (2006.01)

(52) U.S. Cl.
   CPC ............. *G02C 7/041* (2013.01); *G02C 7/066* (2013.01)

(58) Field of Classification Search
   CPC .......... G02C 7/04; G02C 7/041; G02C 7/042; G02C 7/043; G02C 7/044; G02C 7/045
   See application file for complete search history.

(56) References Cited

U.S. PATENT DOCUMENTS 3,597,055 A    8/1971 Neefe
3,684,357 A    8/1972 Tsuetaki
(Continued)

FOREIGN PATENT DOCUMENTS

WO    97/16760 A1    5/1997
WO    2012/118371 A1    9/2012

OTHER PUBLICATIONS

"Expert Progressive: A Contact Lens That Works Like a Progressive Lens"; advertisement and stat sheet from ESSILOR Contact Lens Specialists; ESSILOR International, S.A., Charenton-le-Pont, France; www.essilorcontacts.com; available to inventor prior to filing date of Dec. 15, 2016 (2 pages).

(Continued)

*Primary Examiner* — Darryl J Collins
*Assistant Examiner* — Journey Sumlar
(74) *Attorney, Agent, or Firm* — Hasse & Nesbitt LLC; Daniel F. Nesbitt

(57) ABSTRACT

A progressive or progressive multifocal contact lens having a concave eye-contact surface and a convex forward-facing outer surface for receiving and bending light to the eye. The outer surface consists of an upper distance-viewing zone having a curvature surface, a lower near-viewing zone having a curvature surface, and at least one progressive viewing zone having a crescent shape in forward-facing view. The progressive viewing zone can include a progressive upper distance-viewing zone, a progressive intermediate progressive viewing zone, or a progressive lower near-viewing zone, or a combination of such zones. The progressive viewing zone has a crescent shape and consists of distinct progressive viewing segments having a curvature surface that progresses in curvature in series. The distinct progressive viewing segments of the progressive viewing zones can extend to and converge at any point out to or at the outer peripheral edge of the contact lens.

16 Claims, 12 Drawing Sheets

(56) References Cited

U.S. PATENT DOCUMENTS

| | | | |
|---|---|---|---|
| 4,095,878 A | 6/1978 | Fanti | |
| 4,239,712 A | 12/1980 | Neefe | |
| 4,268,133 A | 5/1981 | Fischer et al. | |
| 4,573,775 A | 3/1986 | Bayshore | |
| 4,618,229 A | 10/1986 | Jacobstein et al. | |
| 4,640,489 A | 2/1987 | Larsen | |
| 4,693,572 A | 9/1987 | Tsuetaki et al. | |
| 4,854,089 A | 8/1989 | Morales | |
| 4,938,583 A * | 7/1990 | Miller | B29D 11/00028 |
| | | | 351/159.74 |
| 4,995,714 A | 2/1991 | Cohen | |
| 5,054,905 A | 10/1991 | Cohen | |
| 5,074,082 A | 12/1991 | Cappelli | |
| 5,296,880 A | 3/1994 | Webb | |
| 5,430,504 A | 7/1995 | Muckenhirn et al. | |
| 5,517,260 A | 5/1996 | Glady et al. | |
| 5,724,120 A | 3/1998 | Svochak et al. | |
| 5,740,707 A | 4/1998 | Svochak et al. | |
| 5,743,159 A | 4/1998 | Svochak et al. | |
| 5,754,270 A | 5/1998 | Rehse et al. | |
| 5,760,870 A | 6/1998 | Payor et al. | |
| 5,843,346 A | 12/1998 | Morrill | |
| 5,861,114 A | 1/1999 | Roffman et al. | |
| 5,907,386 A | 5/1999 | Gupta et al. | |
| 6,592,631 B2 | 6/2003 | Shepard | |
| 6,746,118 B2 | 6/2004 | Mandell | |
| 6,871,953 B1 | 3/2005 | Mandell et al. | |
| 7,799,249 B2 | 9/2010 | Goodenough et al. | |
| 8,522,653 B2 | 9/2013 | Hong et al. | |
| 2004/0017542 A1 | 1/2004 | Lindacher et al. | |
| 2004/0218141 A1 | 11/2004 | Ye et al. | |
| 2005/0041202 A1* | 2/2005 | Jubin | G02C 7/04 |
| | | | 351/159.14 |
| 2005/0068490 A1 | 3/2005 | Mandell et al. | |
| 2005/0128432 A1* | 6/2005 | Altmann | G02C 7/042 |
| | | | 351/159.41 |
| 2005/0274241 A1 | 12/2005 | Mandell et al. | |
| 2008/0312738 A1 | 12/2008 | Wanders | |
| 2015/0088297 A1 | 3/2015 | Gemoules | |

OTHER PUBLICATIONS

"Presbylite II™"; including comments by Al Vaske and David Rusch (p. 1), *Presbylite II™ Bifocal* by Ron Beerten and Al Vaske (p. 2), and *Fitting Guide* from Lens Dynamics Precision Lenses; Lens Dynamics, Inc., Golden, CO., USA, www.lensdynamics.com (pp. 3-4); available to inventor prior to filing date of Dec. 15, 2016 (4 pages).

"DAC ALM Lathe", Advertising brochure and Data Sheet from DAC International, Inc., Carpinteria, CA, USA, dated Feb. 2012 (4 pages).

* cited by examiner

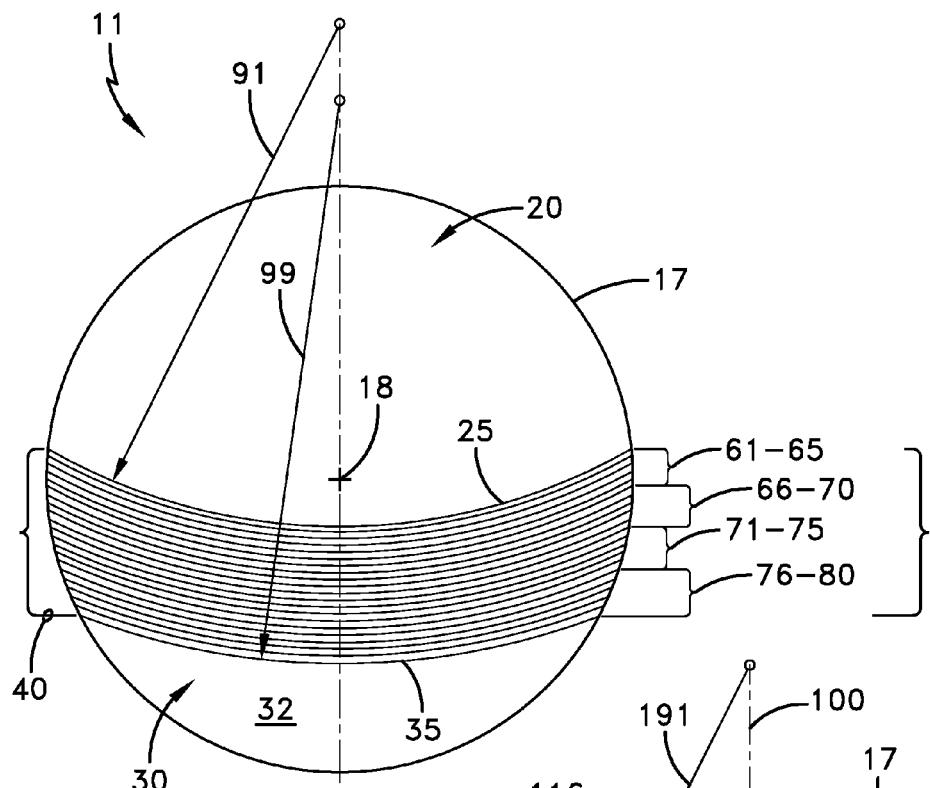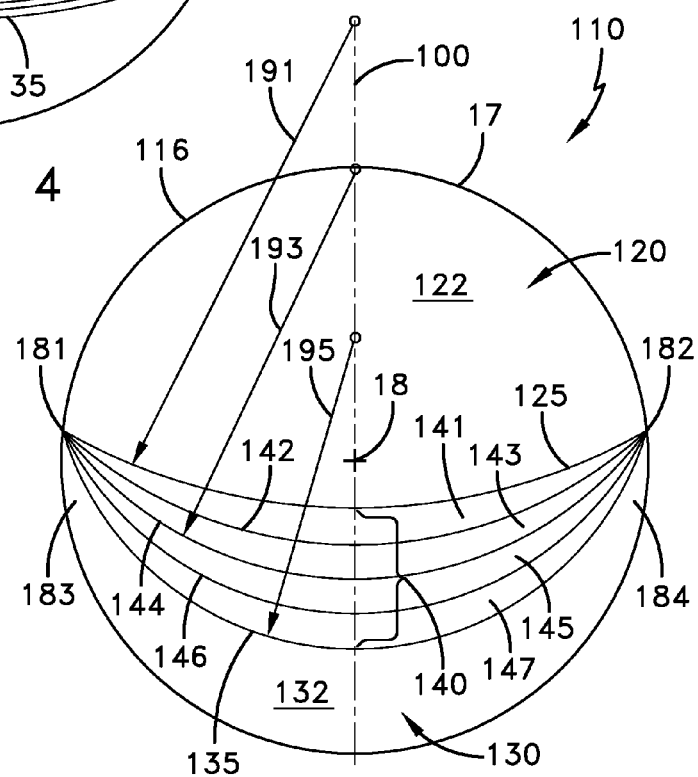

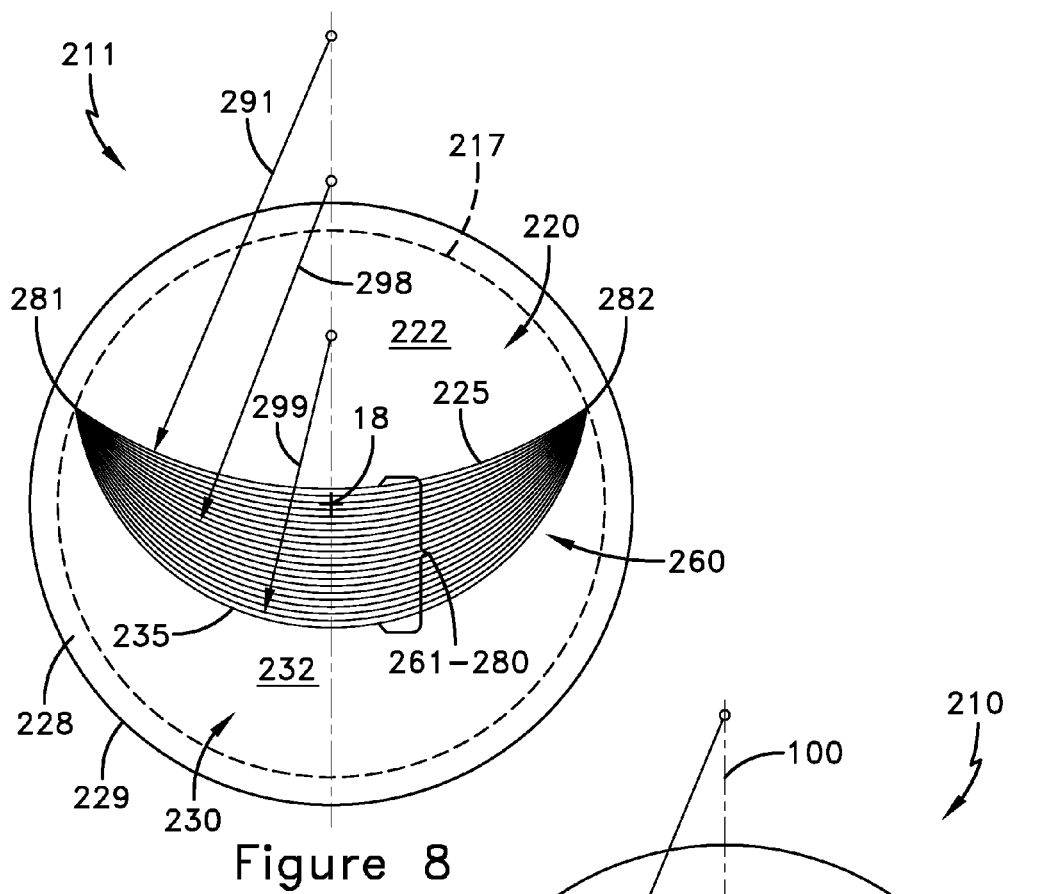
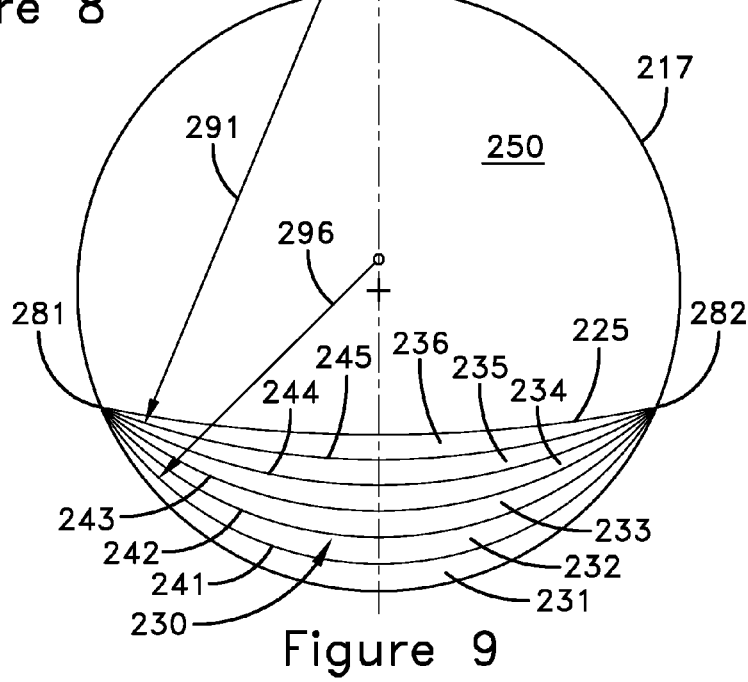

PROGRESSIVE CONTACT LENS

CROSS-REFERENCE TO RELATED APPLICATION

This application claims the benefit of U.S. Provisional Patent Application No. 62/290,909, filed on Feb. 3, 2016, the disclosure of which is incorporated herein by reference.

FIELD OF THE INVENTION

This invention relates to a method of making a progressive contact lens.

BACKGROUND OF THE INVENTION

Contact lenses may be classified in various ways. If classified by number of optical powers they are usually divided into single vision, bifocal, or multifocal lenses. Single vision lenses may be comprised of spherical, aspherical and toric surfaces. Bifocal and multifocal contact lenses can also have spherical, aspherical and toric surfaces. Bifocal contact lenses are lenses with at least two regions of different focal length optical powers, known as zones or segments. Usually, one power is chosen to provide the wearer with clear distance vision and the second power to provide clear near vision, but any two powers may be selected. Multifocal contact lenses are usually comprised of at least three different optical powers or regions of variable power, as in U.S. Pat. No. 4,693,572 (Tsuitaki), U.S. Pat. No. 5,517,260 (Glady) and U.S. Pat. No. 5,754,270 (Rehse).

Multifocal and bifocal contact lenses generally are classified into two types, concentric and vertically segmented. Both types can be produced as rigid or soft contact lenses. Concentric power lenses can be further characterized as having concentric zones of two or several constant spherical powers, with or without aspheric intermediate zones. Concentric designs refract light through each of the zones simultaneously. As a result, multiple images are projected onto the retina creating a circle of confusion or "blur circle" which is transmitted to the brain. The ability of patients to resolve the full range of near, intermediate, and distance images from the blur circle varies greatly among patients. The ability to resolve simultaneous images is further impaired as the patients become older with less crystalline lens accommodative capability, and continued reduction of pupil size.

Vertically segmented lenses have vertically separated power zones, an upper zone that usually provides the appropriate correction for viewing far distances and a lower zone, which usually provides the appropriate correction for viewing near distances, and if present, a middle zone for intermediate distance viewing. The lenses are designed to alternate their position in front of the pupil when the lens moves up and down on the eye as the result of lid forces, which occur when the wearer changes gaze between different distances, a process called alternating vision, as described in U.S. Pat. No. 3,597,055 (Neefe) and U.S. Pat. No. 3,684,357 (Tsuetaki). Because this type produces single power images at the visual axis, the lenses are effective for those brains which do not resolve multiple images, and for those patients who require high near power correction. However, these lenses have proven inadequate for clear vision among patients requiring acuity at a wide array of constantly varying intermediate focal lengths such as for computers, cell phones, and other such purposes.

The vertically separated power zones maintain their relative positions by various features that can be added to control the lens position and stabilize the meridional rotation as described in U.S. Pat. No. 4,095,878 (Fanti); U.S. Pat. No. 4,268,133 (Fischer); U.S. Pat. No. 5,760,870 (Payor); U.S. Pat. No. 5,296,880 (Webb); and U.S. Pat. No. 4,573,775 (Bayshore). This is commonly accomplished in rigid bifocal contact lenses by incorporating differences in thickness of the lens in any manner which abuts the upper and/or lower lid. The lid will tend to squeeze or push a thicker portion of the lens away. Common methods of altering thickness include thin zones at the top or bottom of the lens, thick "bumps" strategically placed to bump into the lids, or prism, to create this function. Prism is well suited to a translating lens to maintain the desired lens orientation and keep the lower zone of the lens downward on the eye as described in U.S. Pat. No. 5,430,504 (Muckenhirn) and U.S. Pat. No. 4,854,089 (Morales) and in Burris, 1993; Bierly, 1995, and Conklin Jr. et al, 1992. The lower edge of the lens is designed to rest upon the lower lid margin of the wearer and the lens shifts up and down relative to the eye as the result of lid forces. There are several subtypes of vertically segmented multifocal contact lenses, based on the shape of the near zone, including round, D-shaped, flat, crescent, and others as described by Conklin Jr. et al, 1992 and in U.S. Pat. No. 4,618,229 (Jacobstein) and U.S. Pat. No. 5,074,082 (Cappelli).

U.S. Pat. No. 6,746,118 to Mandell describes a contact lens comprising a secondary prism that controls vertical lens movement on the eye of a wearer. The anterior surface of the lens has a central optical portion, which in one embodiment contains a bifocal design comprising a distance zone located above a near zone. The secondary prism has a base that extends forward from the lower region of the anterior surface of the lens. When the lens is worn, the base is in apposition or near apposition to the lower lid so that as the wearer looks downward the lid holds the lens in place, which produces an upward movement of the lens relative to the eye. This allows the wearer to view through the lower part of the central optical portion, which contains the optical power for near vision.

U.S. Pat. No. 6,746,118 to Mandell also describes a method for manufacturing a contact lens with secondary prism, which involves a process whereby a lens button, consisting of a cylinder of contact lens material, is machined in a series of steps using an optical lathe. In machining the front surface the first step is to form the button into a shape resembling the top of a hat. Next, the peripheral portion of the hat is shaped to form in part a primary prism and then the central portion of the hat is shaped to form in part a secondary prism and the power zone(s). Various other lens features are added for design enhancements.

U.S. Pat. No. 6,871,953 to Mandell, the disclosure of which is incorporated by reference in its entirety, describes a monocentric bifocal contact lens with upper and lower optical power zones is connected by a transition comprising a family of sigmoidal curves. The sigmoidal curve begins with a common tangent at the boundary of the near zone and, with a reversal of sign from the near zone curve, climbs with increasing positive slope to an inflection point, whereupon it continues to climb with decreasing positive slope until reaching the distance zone curve, with which it has a common tangent. A sigmoidal curve can be constructed from numerous mathematical functions, examples of which include polynomial, conic, transcendental, or cumulative distribution curves.

SUMMARY OF THE INVENTION

The present invention provides progressive contact lens, including a progressive, multifocal contact lens. The progressive contact lens has a convex forward-facing outer surface comprising at least one progressive viewing zone that includes a plurality of progressive viewing segments. The progressive viewing zone is formed onto the forward-facing outer surface in a pattern having a curved or crescent shape. Each progressive viewing segment can have a curvature surface that progresses in curvature in a series, and each pair of adjacent progressive viewing segments in the series of progressive viewing segments, differ in curvature power by a constant or a variable amount of 1.0 diopter and less, which can include 0.4 diopter and less, 0.1 diopter and less, 0.05 diopter and less, and 0.01 diopter and less. The plurality of discrete progressive viewing segments in the at least one progressive viewing zone can include three and more, including five and more, ten and more, fifteen and more, twenty and more, 25 and more, 100 and more, 500 and more, and 1000 and more, viewing segments, and up to 1000, including up to 500, up to 300, up to 200, up to 100, and up to 50, viewing segments.

In an embodiment of the invention, a progressive, multifocal contact lens has a crescent-shaped progressive intermediate zone disposed between a distance-viewing zone and a near-viewing zone.

The progressive contact lens further has a concave eye-contact surface and a convex forward-facing outer surface for receiving and bending light to the eye. The outer surface include a progressive intermediate viewing zone having the crescent shape in forward-facing view, separating substantially completely an upper viewing zone and a lower viewing zone. The progressive intermediate viewing zone comprises a plurality of distinct progressive intermediate viewing segments, each having a crescent shape and a curvature surface that progresses in steeper curvature in series from the inferior border of the upper distance-viewing zone to the superior border of the lower near-viewing zone. The upper viewing zone can include a distance-viewing zone having a curvature surface, and the lower viewing zone can include a lower near-viewing zone having a curvature surface.

In another embodiment of the invention, the plurality of distinct progressive intermediate viewing segments include an uppermost-progressive intermediate viewing segment that borders the upper distance-viewing zone along a curved border, and a lowermost-progressive intermediate viewing segment that borders the lower near-viewing zone along a curved border. The upper distance-viewing zone has a convex shape along its border with the progressive intermediate viewing zone, and the lower near-viewing zone has a concave shape along its border with the progressive intermediate viewing zone. The plurality of discrete progressive intermediate viewing segments can include three and more, including five and more, ten and more, fifteen and more, twenty and more, 25 and more, 100 and more, 500 and more, and 1000 and more, viewing segments, and up to 1000, including up to 500, up to 300, up to 200, up to 100, and up to 50, viewing segments. In another embodiment of the invention, the outer forward-facing surface of the contact lens can have a center point, and the center point can be disposed within the upper distance-viewing zone, or within the progressive intermediate viewing zone.

In another embodiment of the invention, the outer forward-facing surface of the contact lens has an outer peripheral edge, and the progressive intermediate viewing zone can include a first lateral end and an opposed second lateral end, which extend respectively to any point out to, at, or toward the outer peripheral edge. The progressive intermediate viewing zone can separate and isolate the upper distance-viewing zone from the lower near-viewing zone. Each distinct progressive viewing segment can similarly have a first lateral end and an opposed second lateral end, and the plurality of the first lateral ends and second lateral ends, respectively, can extend to any point out to, toward, or along, the outer periphery of the viewing zones of the contact lens. At least two adjacent, distinct progressive viewing segments in the plurality of progressive viewing zones can have opposed first and second lateral ends that extend to and also converge at any point out to, toward, or along the outer periphery of the viewing zones of the contact lens.

In another embodiment of the invention, each of the plurality of distinct progressive viewing segments has a first lateral end and an opposed second lateral end, and each of the plurality of the first lateral ends and second lateral ends, respectively, which can extend to and converge at any point out to, toward, or at the outer periphery of the viewing zones.

In another embodiment of the invention, a progressive contact lens has a concave eye-contact surface and a convex forward-facing outer surface for receiving and bending light to the eye, the outer surface comprising a progressive near-viewing zone, the progressive near-viewing zone comprising a plurality of progressive near-viewing segments, each progressive near-viewing segment having a curvature surface, wherein the plurality of said curvature surfaces progress in curvature in a series. Each pair of adjacent progressive near-viewing segments in the series of progressive near-viewing segments, differ in curvature power by a constant or a variable amount of 1.0 diopter and less, which can include 0.4 diopter and less, 0.1 diopter and less, 0.05 diopter and less, and 0.01 diopter and less. Each progressive near-viewing segment has a crescent shape, or a linear or executive-style shape. The contact lens can further include a distance-viewing zone having a curvature surface, the distance-viewing zone being disposed above the progressive near-viewing zone.

In an alternative embodiment, the contact lens having the progressive near-viewing zone can also include a distance-viewing zone comprising a plurality of progressive distance-viewing segments, each progressive distance-viewing segment having a curvature surface, wherein the plurality of said curvature surfaces progress in curvature in a series. Each progressive distance-viewing segment has a crescent shape, or a linear or executive-style shape. The contact lens can further include a progressive intermediate viewing zone, separating the progressive near-viewing zone and the progressive distance-viewing zone. The progressive intermediate viewing zone can include a plurality of progressive intermediate-viewing segments, each progressive intermediate-viewing segment having a curvature surface, wherein the plurality of said curvature surfaces progress in curvature in a series. Each pair of adjacent progressive distance-viewing segments or adjacent progressive intermediate-viewing segments differ in curvature power by a constant or a variable amount of 1.0 diopter and less, which can include 0.4 diopter and less, 0.1 diopter and less, 0.05 diopter and less, and 0.01 diopter and less. The progressive intermediate-viewing zone has a crescent shape, or a linear or executive-style shape.

In another embodiment of the invention, a progressive contact lens has an outer surface comprising a progressive distance-viewing zone comprising a plurality of progressive distance-viewing segments, each having a curvature surface, wherein the plurality of said curvature surfaces progresses in curvature in a series, and each pair of adjacent progressive distance-viewing segments in the series of progressive distance-viewing segments, differ in curvature power by a constant or a variable amount of 1.0 diopter and less, which can include 0.4 diopter and less, 0.1 diopter and less, 0.05 diopter and less, and 0.01 diopter and less. The progressive distance-viewing zone has a crescent shape, or a linear or executive-style shape.

In an alternative embodiment, the contact lens having the progressive distance-viewing zone can also include a near-viewing zone having a curvature surface, the near-viewing zone being disposed below the progressive distance-viewing zone. In another alternative embodiment, the contact lens having the progressive distance-viewing zone can also include a progressive intermediate-viewing zone, separating the progressive distance-viewing zone and a near-viewing zone, the progressive intermediate-viewing zone including a plurality of progressive intermediate-viewing segments, each progressive intermediate-viewing segment having a curvature surface, wherein the plurality of said curvature surfaces progress in curvature in a series. Each pair of adjacent progressive distance-viewing segments, intermediate-viewing segments, or near-viewing segments in the series of progressive viewing segments can differ in curvature power by a constant or a variable amount of 1.0 diopter and less, including by 0.4 diopter and less, 0.1 diopter and less, 0.05 diopter and less, and 0.01 diopter and less.

BRIEF DESCRIPTION OF DRAWINGS

FIG. 4 is an alternative embodiment of the contact lens of FIG. 1 with twenty distinct progressive viewing segments.

FIG. 5 is front forward-facing view of a second embodiment of a contact lens of the invention, showing an upper distance-viewing zone, a lower near-viewing zone, and a crescent-shaped progressive intermediate viewing zone consisting of four separate and distinct parallel curved viewing segments that converge at a peripheral edge.

FIG. 8 is an alternative embodiment of the contact lens of FIG. 7, having an annular peripheral zone with a perimeter that extends beyond the focal areas of the lens.

FIG. 9 is another embodiment of a progressive contact lens having a progressive near-viewing zone having a crescent shape of curved segments that converge at the periphery.

DETAILED DESCRIPTION OF THE INVENTION

The term "concave", in relation to a shape of a viewing zone or segment on an outer surface of a contact lens, means a curve with sides extending upward from a center.

Figure 1:
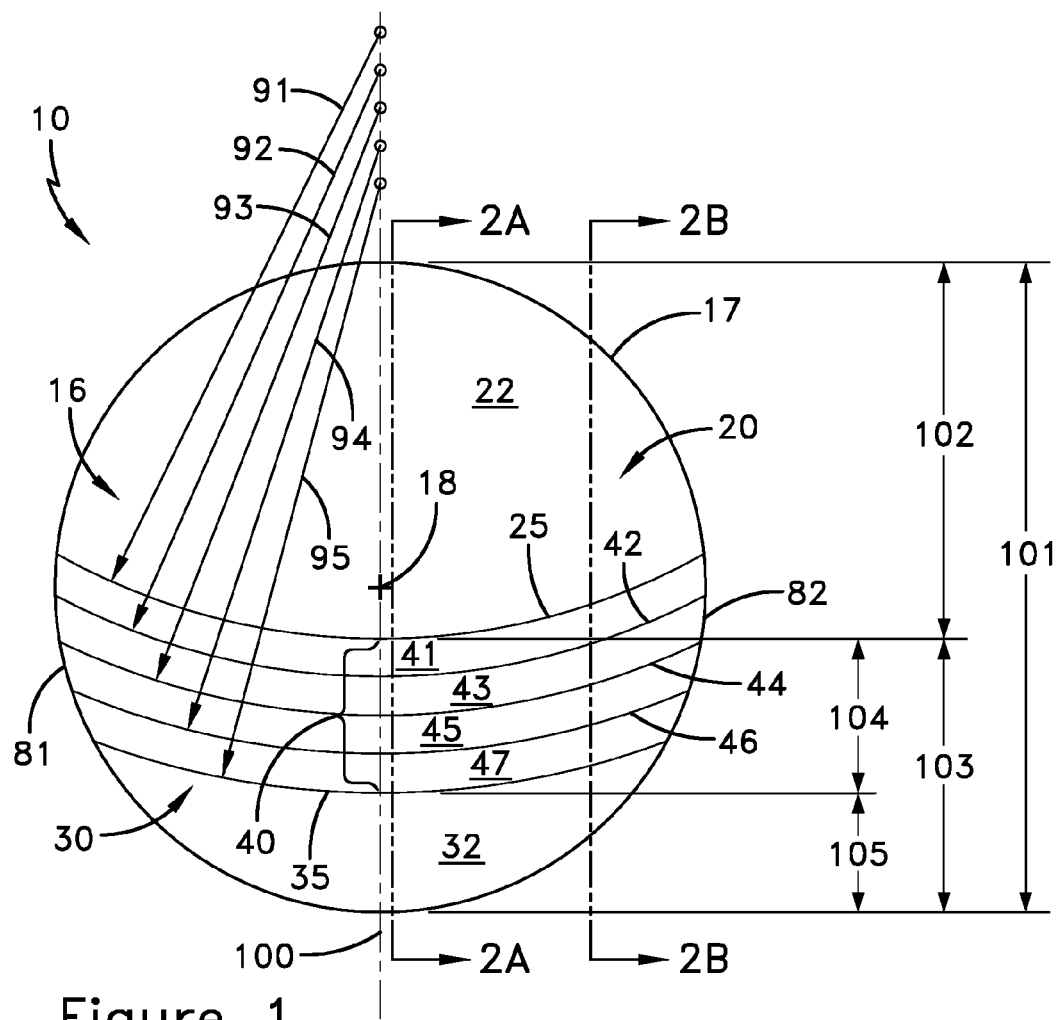
FIG. 1 is front forward-facing view of an embodiment of a multifocal contact lens of the invention, showing an upper distance-viewing zone, a lower near-viewing zone, and a crescent-shaped progressive intermediate viewing zone consisting of four separate and distinct parallel, curved viewing segments.
Figure 3:
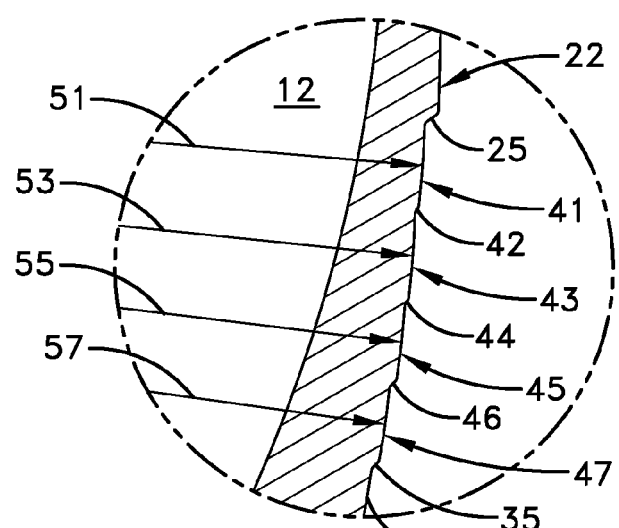
FIG. 3 is an enlarged view of the segment 3 of FIG. 2A.
Figure 2A:
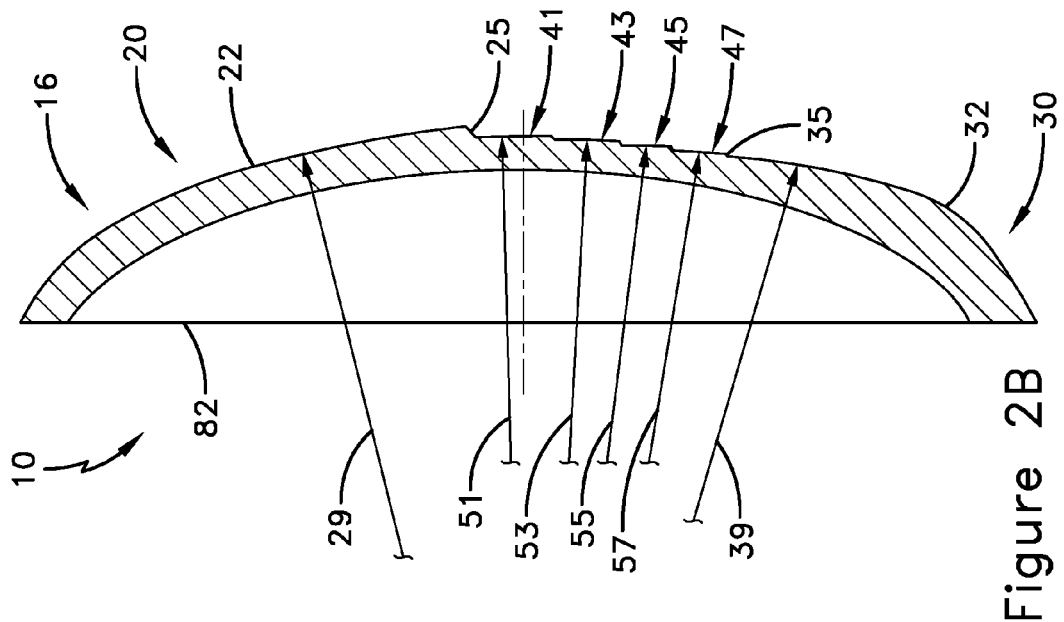
FIG. 2A is a sectional view of the contact lens of FIG. 1, taken along line 2A-2A.

FIGS. 1 and 2A show a forward-facing plan view of a progressive trifocal contact lens 10 having a concave eye-contact surface 12 and a convex forward-facing outer surface 16 for receiving and bending light to an eye. The eye-contact surface 12 is designed in a manner so as to fit the cornea of the wearer using methods known to those familiar with the state of the art. The outer surface 16 consists of an upper distance-viewing zone 20, a lower near-viewing zone 30, and a progressive intermediate viewing zone 40 having a crescent shape in the forward-facing view. The upper, distance-viewing zone 20 has a curvature surface 22 defined by curvature radii 29, shown in FIG. 2. A lower, near-viewing zone 30 has a curvature surface 32 defined by curvature radii 39. The progressive intermediate viewing zone 40 separates substantially completely the upper zone 20 and the lower zone 30. The progressive intermediate viewing zone 40 comprises a plurality of distinct progressive viewing segments 41, 43, 45, and 47, each having a crescent shape and a curvature surface defined by curvature radii 51, 53, 55, and 57 (FIG. 2A). The curvature power of the distinct progressive viewing segments 41, 43, 45, and 47 progress in curvature power from the segment 41 adjacent the upper distance-viewing zone 20 to the segment 47 adjacent the lower near-viewing zone 30. Each pair of adjacent progressive segments in the series of progressive intermediate-viewing segments 41, 43, 45, and 47, differ in curvature power by a constant or a variable amount of 1.0 diopter and less, which can include 0.4 diopter and less, 0.1 diopter and less, 0.05 diopter and less, and 0.01 diopter and less.

FIG. 1 also illustrates a curved border line 25 between the upper, distance-viewing zone 20 and the uppermost-progressive viewing zone 41 of the progressive viewing zone 40, having a concave shape having a radius 91. A curved border line 35 between the near-viewing zone 30 and the lower-most-progressive viewing zone 47 of the progressive intermediate viewing zone 40 has a pattern in the forward-facing outer surface having a concave shape having the radius 95. Each of the curved border lines 25 and 35, and intermediate border lines 42, 44 and 46, has a shape along its length, or has two or more portions along its length, which are defined by a radius. In the illustrated embodiment, the curved border lines 25, 42, 44, 46 and 35 are defined by respective radii 91, 92, 93, 94, and 95. The radius 91 can be, and is typically, greater than a diameter of the lens 10.

In the illustrated embodiment, the width (vertical height) of the distinct progressive viewing segments 41, 43, 45, 47 are substantially identical, though in an alternative embodiment the distinct progressive viewing segments can have different widths, including progressively or variably larger or smaller widths. The radii 91-95 are typically of the same or similar radius.

FIG. 1 also shows a vertical diameter line 100, having a height (diameter) 101. The dimension 102 is the span of the distance-viewing zone 20 along line 100, and the dimension 103 is the distance of the progressive intermediate viewing zone 40 from the bottom end of the lens 10. Dimensions 104 and 105 represent the heights of the progressive intermediate viewing zone 40 and the near-viewing zone 30 along line 100, respectively. In the illustrated embodiment, the distance-viewing zone 20 spans beyond and encompasses the center point 18 of the lens 10.

Figure 2B:
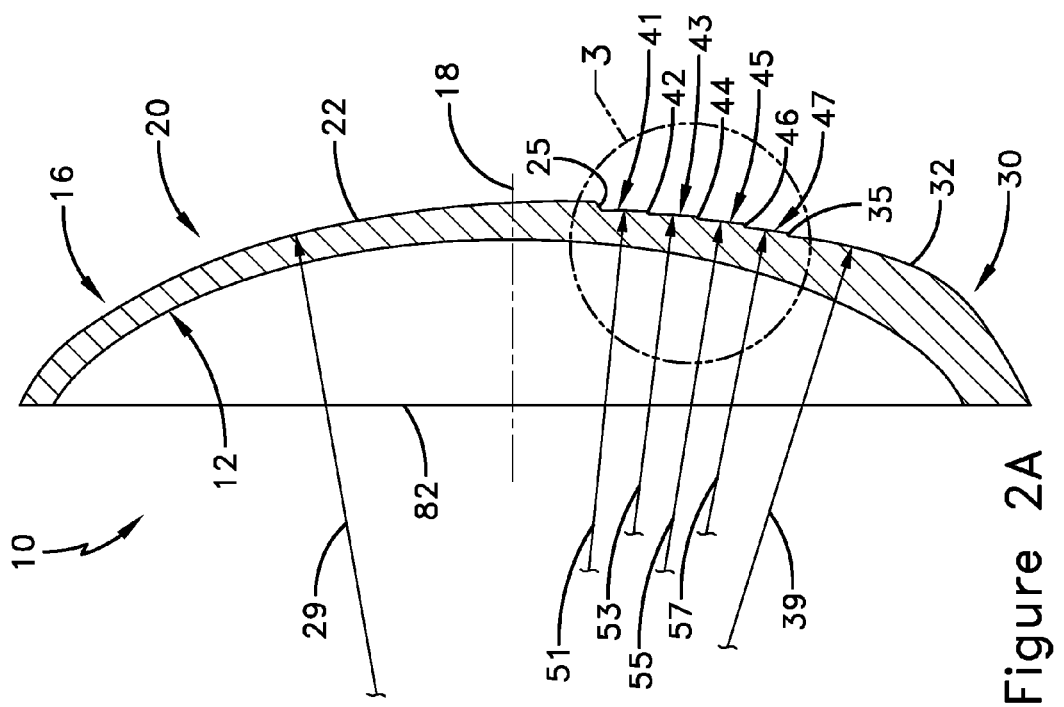
FIG. 2B is a sectional view of the contact lens of FIG. 1, taken along line 2B-2B.

Sectional views of FIGS. 2A and 2B taken along the vertical diameter line 100 to illustrate the transitions between the viewing segments formed in the outer surface 16 of the lens. The distance-viewing zone 20 has a forward surface having a radius 29 that extends down to the border line 25. The surface of the lens transitions from the distance-viewing zone 20 to the upper-most distinct progressive viewing segment 41, along the sloped border line 25 (FIG. 2A). The surface of the lens similarly transitions at the borders between adjacent distinct progressive viewing segments 41, 43, 45, and 47 along respective cross-sectional, sloped border lines 42, 44, and 46. The lower-most distinct progressive viewing segment 47 transitions to the near-viewing zone 30 along the cross-sectional, sloped border line 35. The cross-sectional shape of the sloped border lines between adjacent viewing zones is curved and typically sinusoidal.

Although FIG. 1 shows a contact lens having four progressive intermediate-viewing segments, any plurality of distinct progressive viewing segments can be made as needed. For example, the number of distinct progressive viewing segments can include three or more, including five or more, ten or more, fifteen or more, twenty or more, 25 or more, 100 or more, 500 or more, and 1000 or more, viewing segments, and up to 1000, including up to 500, up to 300, up to 200, up to 100, and up to 50, viewing segments. FIG. 4 shows a non-limiting example of a contact lens having the intermediate viewing zone 40 having twenty viewing segments 61-80 in the progressive intermediate viewing zone.

The contact lens of FIG. 1 also illustrates the progressive intermediate viewing zone 40 having a first lateral end 81 on the left side, and a second lateral end 82 on the opposite right side. Each of the first and second lateral ends 81,82 of the viewing zone 40 extends to, and forms an arc portion of, the outer periphery 17. Correspondingly, each distinct progressive viewing segment 41, 43, 45, 47 has a portion of the first lateral end 81 and of the opposite second lateral end 82, and each extends to, and forms an arc portion of, the outer periphery.

FIG. 5 shows a second embodiment of a progressive multifocal contact lens 110, showing a progressive intermediate viewing zone 140 having a crescent shape in the forward-facing view. The contact lens 110 differs substantially from the contact lens 10 where the progressive intermediate viewing zone 140 has first lateral end 181 and second opposed lateral end 182 that extend to and converge to substantially a single point at, or to a short arc segment along, the outer periphery 17. Correspondingly, at least two adjacent, distinct progressive viewing segments, and specifically all four of the distinct progressive viewing segments 141, 143, 145, and 147, extend from the first lateral end 181 to the opposed second lateral end 182. In comparison with the first embodiment of contact lens 10, the lateral ends 183,184 of the near-viewing zone 130 extend further along the periphery 17 and into the area lateral to the progressive intermediate viewing zone. Each pair of adjacent progressive segments in the series of progressive intermediate-viewing segments 141, 143, 145, and 147, differ in curvature power by a constant or a variable amount of 1.0 diopter and less, which can include 0.4 diopter and less, 0.1 diopter and less, 0.05 diopter and less, and 0.01 diopter and less.

FIG. 5 illustrates a curved border line 125 having a concave shape, between the upper, distance-viewing zone 120, and the uppermost-progressive viewing segment 141 of the progressive intermediate viewing zone 140. Conversely, a curved border line 135 having a concave shape is disposed between the near-viewing zone 130, and the lowermost-progressive viewing segment 147 of the progressive intermediate viewing zone 140. Accordingly, each of the curved border lines 125, 142, 144, 146 and 135 has a shape along its length, or has two or more portions along its length, that are defined by a radius. In the illustrated embodiment, the curved border lines 125, 142, 144, 146 and 135 are defined by respective radii, including 191, 193 and 195, where the radii decrease in length from radius 191 to the radius 195. For example, the border line 144 separating progressive viewing segments 143 and 145 has a radius 193 that is intermediate in length to the lengths of radii 191 and 195. The radius 191 is typically greater than a diameter of the lens 110, while a radius 195 can be shorter than the diameter. In the illustrated embodiment, the width (vertical height) of the distinct progressive viewing segments 141, 143, 145, and 147 along the vertical centerline 100 are substantially identical, though in an alternative embodiment the distinct progressive viewing segments can have different widths, including progressively or variably larger or smaller widths. The width (vertical height) of any one of the plurality, including all, of the progressive viewing segments 141, 143, 145, and 147, diminishes (lessens) as the viewing zone extends toward, and tapers to a point at, their lateral ends 181 and 182.

Figure 6:
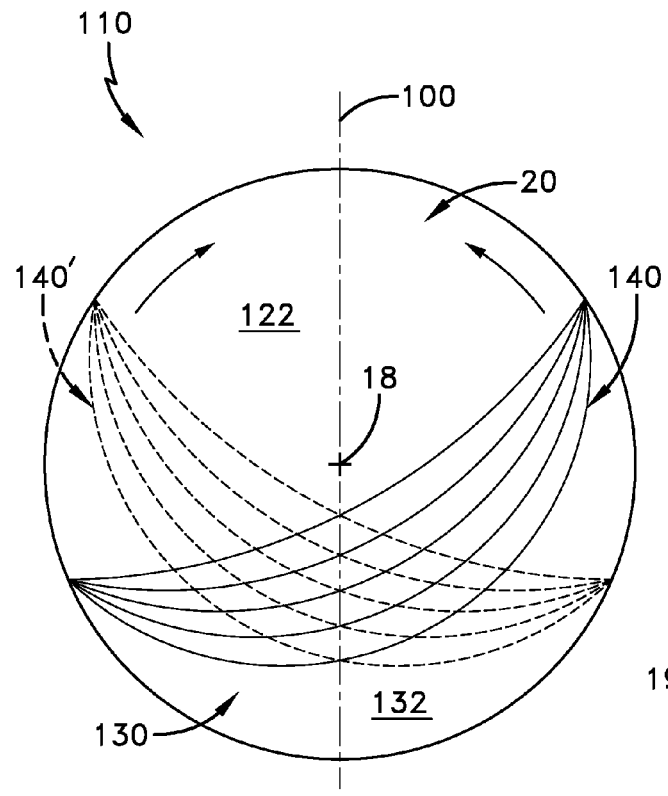
FIG. 6 shows the embodiment of FIG. 5 rotated both counterclockwise and clockwise (in dashed lines), to illustrate the constancy of the viewing zones as the lens rotates upon the eye.

The configuration of a crescent-shaped progressive intermediate viewing zone, such as zone 140, provides a more constant zone of distance-viewing power through zone 120, which reduces the sensitivity of the wearer's transition viewing when the lens rotates spontaneously upon the eye during ordinary wearing conditions. Without being bound by any particular theory, FIG. 6 shows the contact lens 110 rotated in the counterclockwise direction about the center point 18, shown in solid lines, and alternatively in the clockwise direction about the center point 18, shown in dashed lines, to illustrate the constancy of the distance-viewing zone and of the progressive intermediate viewing zone 140, along the vertical centerline 100.

Figure 7:
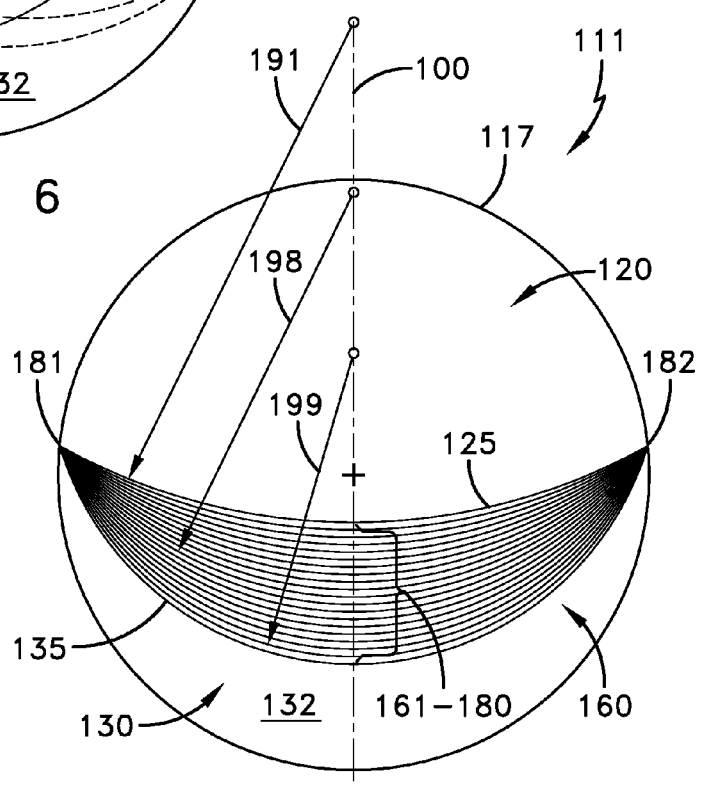
FIG. 7 is an alternative of the second embodiment of the contact lens shown in FIG. 6, with twenty distinct progressive viewing segments.

FIG. 7 illustrates a contact lens 111 having a twenty intermediate viewing segments 160, including distinct viewing segments 161-180, the plurality of distinct viewing segments extending laterally, individually and as a group, toward and to respective converging points 181 and 182 along a periphery 117. The border lines 125, 135, and intermediate border lines between the viewing segments 161-180, have a radius 191, radius 199, and intermediate radii, including by example radius 198. Though any plurality of distinct progressive viewing segments can practically be made, the number of distinct curved and converging viewing segments can include three or more, including five and more, ten and more, fifteen and more, twenty and more, 25 and more, 100 and more, 500 and more, and 1000 and more, viewing segments, and up to 1000, including up to 500, up to 300, up to 200, up to 100, and up to 50, viewing segments.

Where the progressive viewing zone includes a significant number of segments, for example, 50 segments for illustration, the width (vertical height) of each segment is proportionally shorter, and the width diminishes to essentially zero when such segment tapers to the converging points. In another embodiment of the invention, in the region of the progressive viewing zone disposed at or near the periphery, one or more of a first group of viewing segments can be merged into an adjacent viewing segment to reduce the number, and increase the resolution, of remaining viewing segments in the viewing zone that proceeds toward the converging point(s) and/or the periphery.

While the progressive multifocal contact lenses illustrated in FIG. 5 or 7 show the center point 18 disposed within the upper distance-viewing zone 20,120, an alternative embodiment of the progressive multifocal contact lens 110 shown in FIG. 8 illustrates, inter alia, the center point 18 disposed within the intermediate-viewing zone 130. The border lines 225, 235, and intermediate border lines between distinct segments 261-280, have a radius 291, radius 299, respectively, and intermediate radii including radius 298, as described in the second embodiment illustrated in FIG. 7.

FIG. 8 also shows an embodiment of a contact lens 110, further having an annular peripheral zone 228 having an outer perimeter 229, which extends beyond the focal periphery 217 of the focal areas of the lens.

The present invention also provides a progressive contact lens and a method for its manufacture, having a progressive near-viewing zone, a progressive distance-viewing zone, or both a progressive near-viewing zone and a progressive distance-viewing zone. In addition, the progressive contact lens that has the progressive near-viewing zone and/or the progressive distance-viewing zone, can also include an intermediate viewing zone, which can include a progressive intermediate viewing zone.

The progressive near-viewing zone can comprise crescent-shaped viewing segments, which can have a crescent shape of curved viewing segments that converge at a periphery, or a crescent shape of parallel curved viewing segments. Alternatively, the progressive near-viewing zone can comprise executive-style parallel, linear viewing segments.

The progressive distance-viewing zone can comprise crescent-shaped segments, which can have a crescent shape of segments that converge at the periphery, or a crescent shape of parallel curved segments.

FIG. 9 shows an embodiment of a progressive contact lens 210 having a progressive near-viewing zone 230 having a crescent shape of segments 231-236 that have lateral ends that converge at the periphery 217. A curved border line 225 defines a border between the progressive near-viewing zone 230 and an upper viewing zone 250, and defines a concave shape. Each of the curved border lines 241, 242, 243, 244, and 245 has a shape along its length, or has two or more portions along its length, that are defined by a radius. The radius of the shape decreases progressively in length, between the radius 291 of border line 245, to the radius 296 of border line 241. In the illustrated embodiment, the width (vertical height) of the distinct progressive viewing segments 231, 232, 233, 234, 235, and 236 along the vertical centerline 100 are substantially identical, though in an alternative embodiment the distinct progressive viewing segments can have different widths, including progressively or variably larger or smaller widths. The width (vertical height) of any one of the plurality, including all, of the progressive viewing segments 231, 232, 233, 234, 235, and 236, diminishes (lessens) as the viewing segment extends toward, and tapers to or toward a point at, the lateral ends 281 and 282. Each pair of adjacent progressive segments in the series of progressive intermediate-viewing segments 231, 232, 233, 234, 235 and 236, differ in curvature power by a constant or a variable amount of 1.0 diopter and less, which can include 0.4 diopter and less, 0.1 diopter and less, 0.05 diopter and less, and 0.01 diopter and less.

The upper viewing zone 250 can be a distance viewing zone, of a desired optical power for distance viewing.

Although six distinct viewing segments are shown in the progressive near-viewing zone 230 for the embodiment in FIG. 9, the plurality of discrete progressive near-viewing segments can include three and more, including five and more, ten and more, fifteen and more, twenty and more, 25 and more, 100 and more, 500 and more, and 1000 and more, viewing segments, and up to 1000, including up to 500, up to 300, up to 200, up to 100, and up to 50, viewing segments.

Figure 10:
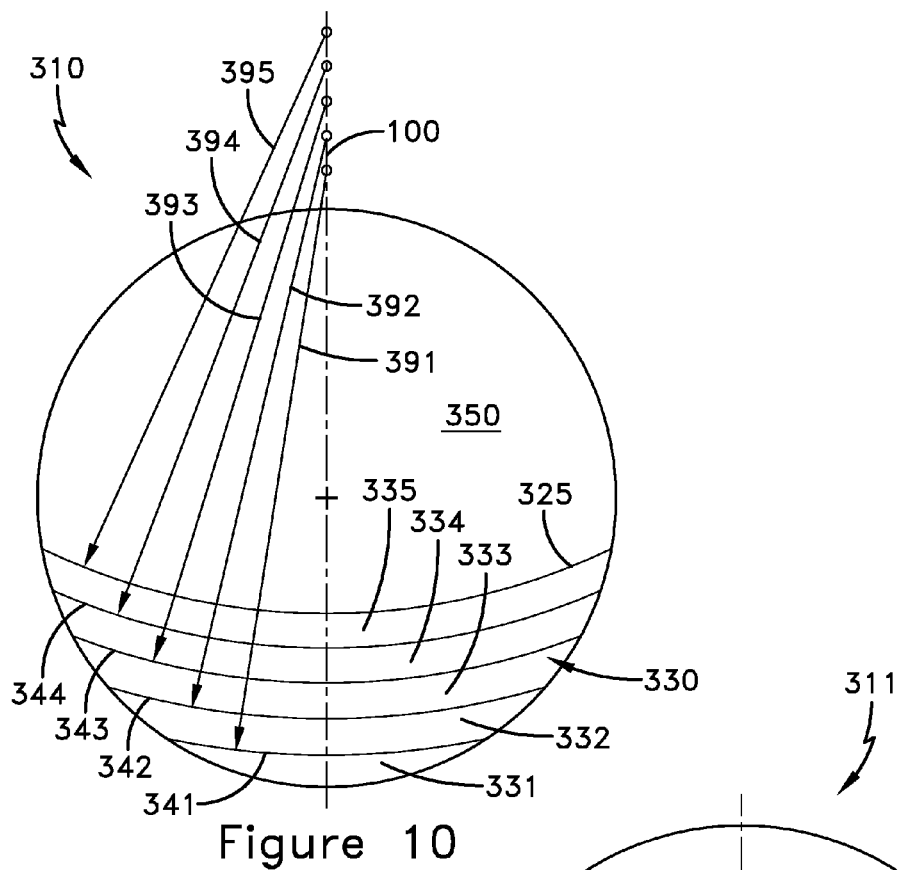
FIG. 10 is an alternative embodiment of a progressive contact lens having a progressive near-viewing zone having a crescent shape of parallel, curved segments.

FIG. 10 is an alternative embodiment of a progressive contact lens 310 having a progressive near-viewing zone 330 having a crescent shape of parallel curved segments, and an upper viewing zone 350. A curved border line 325 defines a border between the progressive near-viewing zone 330 and an upper viewing zone 350, and defines a concave shape having a radius 395. The progressive near-viewing zone 330 comprises a plurality of distinct progressive near-viewing segments 331, 332, 333, 334, and 335, each having a crescent shape and a curvature surface defined by curvature radii that progress in curvature power from the upper near-viewing segment 335 to the lower near-viewing segment 331 (as described above and illustrated in FIG. 2A). Each of the curved border lines 341, 342, 343, and 344, separating the distinct progressive near-viewing segments 331-335, have respective radii 391, 392, 393 and 394, each of substantially the same length. The width (vertical height) of the distinct near-progressive viewing segments 331, 332, 333, 334, and 335 can be identical. In an alternative embodiment, the distinct progressive near-viewing segments can have different widths, including progressively or variably larger or smaller widths. Although five distinct viewing segments are shown in the embodiment in FIG. 10, the plurality of discrete progressive distance-viewing segments can include three and more, including five and more, ten and more, fifteen and more, twenty and more, 25 and more, 100 and more, 500 and more, and 1000 and more, viewing segments, and up to 1000, including up to 500, up to 300, up to 200, up to 100, and up to 50, viewing segments.

The upper viewing zone 350 can be a distance viewing zone, of a desired optical power for distance viewing.

Figure 11:
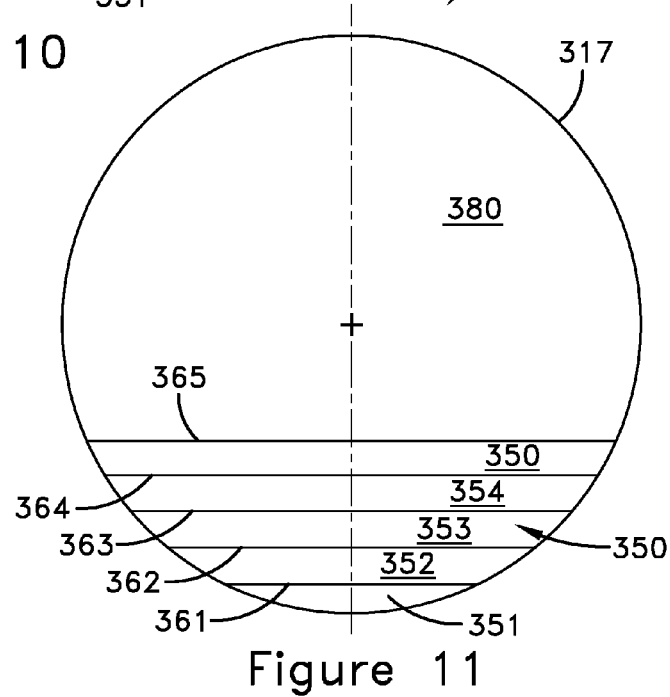
FIG. 11 is another alternative embodiment of a progressive contact lens having a progressive near-viewing zone having executive-style parallel, linear segments.

FIG. 11 is an alternative embodiment of a progressive contact lens 311 having a progressive near-viewing zone 350 having executive-style parallel, linear segments. A horizontal, linear border line 365 defines a border between the progressive near-viewing zone 350 and an upper viewing zone 380. The progressive near-viewing zone 350 comprises a plurality of distinct progressive near-viewing linear segments 351, 352, 353, 354, and 355, defined by horizontal, linear border lines 361, 362, 363, 364, and 365. The width (height) of the distinct near-progressive viewing segments 351, 352, 353, 354, and 355 are substantially identical, and are typically of constant width extending laterally to the periphery 317. In an alternative embodiment, the distinct progressive near-viewing segments can have different widths, including progressively or variably larger or smaller widths. Although five distinct viewing segments are shown in the embodiment in FIG. 11, the plurality of discrete progressive distance-viewing segments can include three and more, including five and more, ten and more, fifteen and more, twenty and more, 25 and more, 100 and more, 500 and more, and 1000 and more, viewing segments, and up to 1000, including up to 500, up to 300, up to 200, up to 100, and up to 50, viewing segments.

The upper viewing zone 380 can be a distance viewing zone, of a desired optical power for distance viewing.

Figure 12:
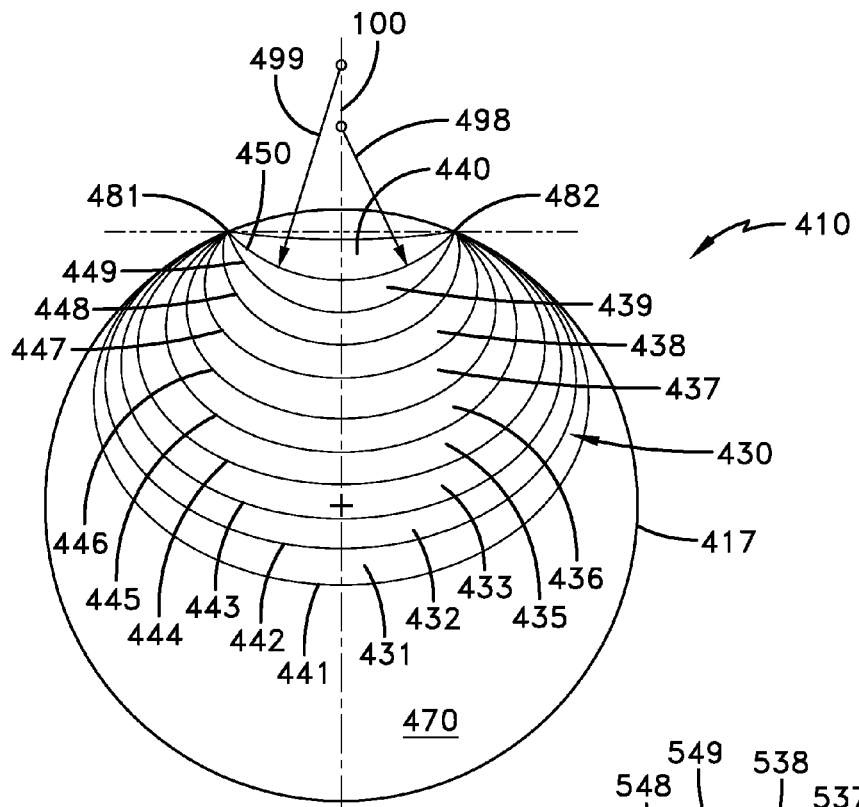
FIG. 12 is an embodiment of a progressive contact lens having a progressive distance-viewing zone having a crescent shape of curved segments that converge at the periphery.

FIG. 12 shows an embodiment of a progressive contact lens 410 having a progressive distance-viewing zone 430 having a rounded or crescent shape, consisting of a plurality of concave-shaped viewing segments that converge at, toward, or along the periphery 417. A curved, concave border line 441 defines a border between the progressive distance-viewing zone 430 and a lower viewing zone 470. The progressive distance-viewing zone 430 includes a plurality of distinct progressive distance-viewing segments having concave shape, including crescent- and concave-shaped segments 431-440. In the illustrated embodiment, the width (vertical height) of the distinct progressive viewing segments 431-440 along the vertical centerline 100 are substantially identical, though in an alternative embodiment the distinct progressive viewing segments can have different widths, including progressively or variably larger or smaller widths. The width (vertical height) of any one of the plurality, including all, of the progressive viewing segments 431-440 diminishes (lessens) as the viewing zone extends laterally toward, and tapers to converging points 481 and 482.

Each of the curved border lines 441-450 has a curvature. An upper group of the distinct progressive distance-viewing segments, namely segments 439 and 440 can be defined by border lines 448, 449 and 450, each defined by a curve having a shape along its length, or having two or more portions along its length, that are defined by a radius, for example, radii 498 and 499. A lower group of the distinct progressive distance-viewing segments, namely segments 431, 432, 433, 434, 435, 436 and 437, are defined by border lines 441, 442, 443, 444, 445, 446, 447 and 448, each having a shape along its length, or having two or more portions along its length, that are defined by a radius. In illustrated embodiment, the border lines 441, 442, 443, 444, 445, 446, 447 and 448 can be defined by elliptical curves. The elliptical-shaped border lines extend laterally the viewing segments 431, 432, 433, 434, 435, 436 and 437 into the lateral portions of the upper surface of the contact lens. The upper viewing zone 470 can be a near-viewing zone, of a desired optical power for near viewing.

Although ten distinct viewing segments are shown in the embodiment in FIG. 12, the plurality of discrete progressive distance-viewing segments can include three and more, including five and more, ten and more, fifteen and more, twenty and more, 25 and more, 100 and more, 500 and more, and 1000 and more, viewing segments, and up to 1000, including up to 500, up to 300, up to 200, up to 100, and up to 50, viewing segments.

Figure 13:
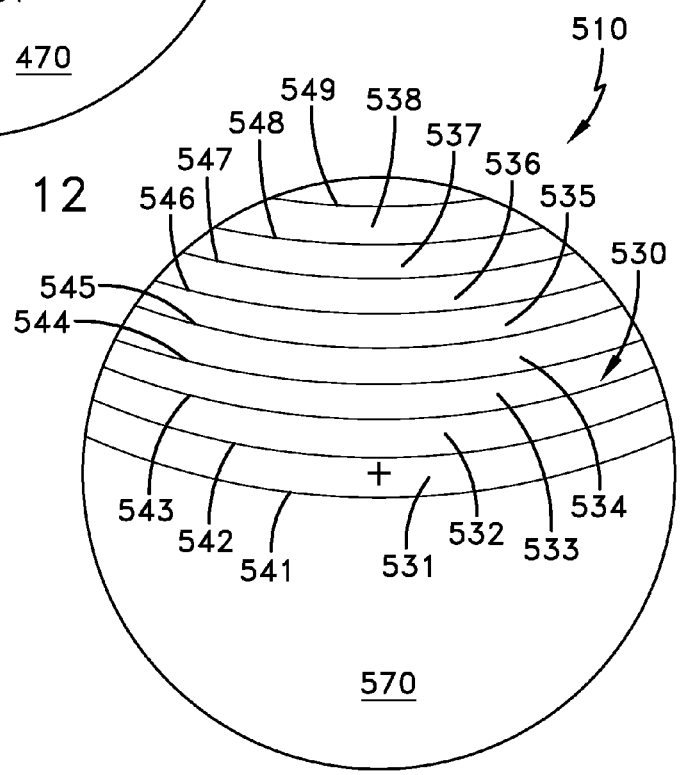
FIG. 13 is an alternative embodiment of a progressive contact lens having a progressive distance-viewing zone having a crescent shape of parallel, curved segments.

FIG. 13 is an alternative embodiment of a progressive contact lens 510 having a progressive distance-viewing zone having a crescent shape of parallel, curved segments. Progressive contact lens 510 having a progressive distance-viewing zone 530 having a crescent shape of parallel, curved segments, and a lower viewing zone 570. A curved border line 541 defines a border between the progressive distance-viewing zone 530 and the lower viewing zone 570, and defines a concave shape having a radius. Each of the curved border lines 541-549, separating the distinct progressive distance-viewing segments 531-538, have a respective radii, each of substantially the same length, whereby the width (height) of the distinct near-progressive viewing segments 531-538 are substantially identical. In an alternative embodiment, the distinct progressive near-viewing segments can have different widths, including progressively or variably larger or smaller widths. Although eight distinct viewing segments are shown in the embodiment in FIG. 14, the plurality of discrete progressive distance-viewing segments can include three and more, including five and more, ten and more, fifteen and more, twenty and more, 25 and more, 100 and more, 500 and more, and 1000 and more, viewing segments, and up to 1000, including up to 500, up to 300, up to 200, up to 100, and up to 50, viewing segments. The upper viewing zone 570 can be a distance viewing zone, of a desired optical power for di stance viewing.

Figure 14:
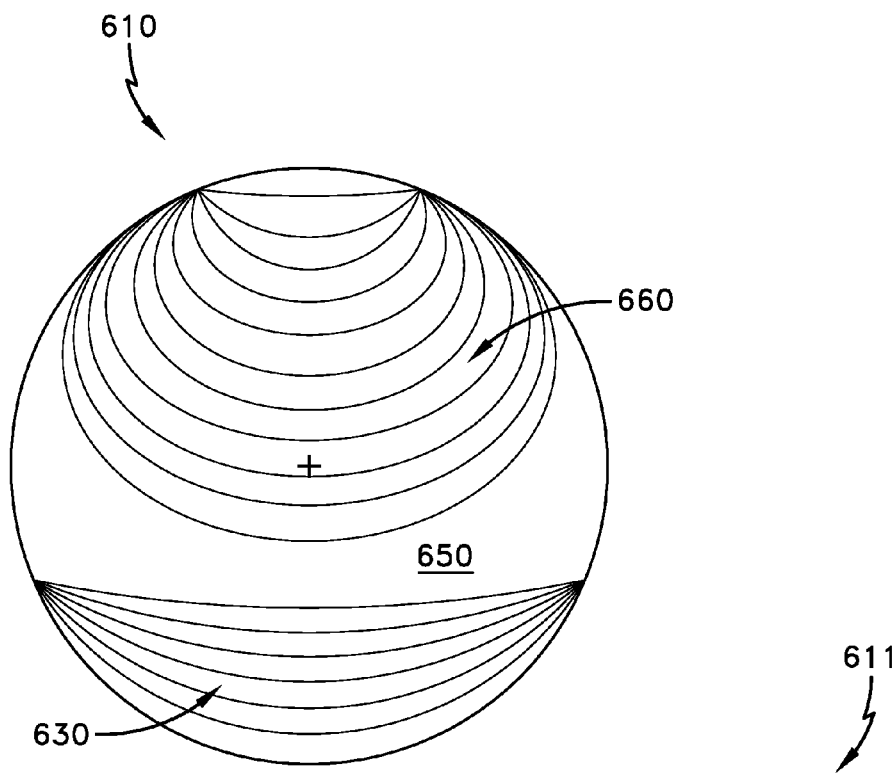
FIG. 14 is an embodiment of a progressive contact lens having a progressive distance-viewing zone and a progressive near-viewing zone, the progressive distance-viewing zone having a crescent shape of curved segments that converge at the periphery, and the progressive near-viewing zone having a crescent shape of curved segments that converge at the periphery.

FIG. 14 is an embodiment of a progressive contact lens having both a progressive distance-viewing zone and a progressive near-viewing zone. The progressive contact lens 610 includes a progressive distance-viewing zone 660 having a crescent shape of curved segments that converge at the periphery, substantially as described for the embodiment shown in FIG. 12, and a progressive near-viewing zone 630 having a crescent shape of segments that converge at the periphery, substantially as described for the embodiment shown in FIG. 9. An intermediate viewing zone 650 is disposed between the progressive distance-viewing zone 660 and the progressive near-viewing zone 630. The intermediate viewing zone 650 can be an intermediate viewing zone, having a desired optical power for intermediate viewing.

Figure 15:
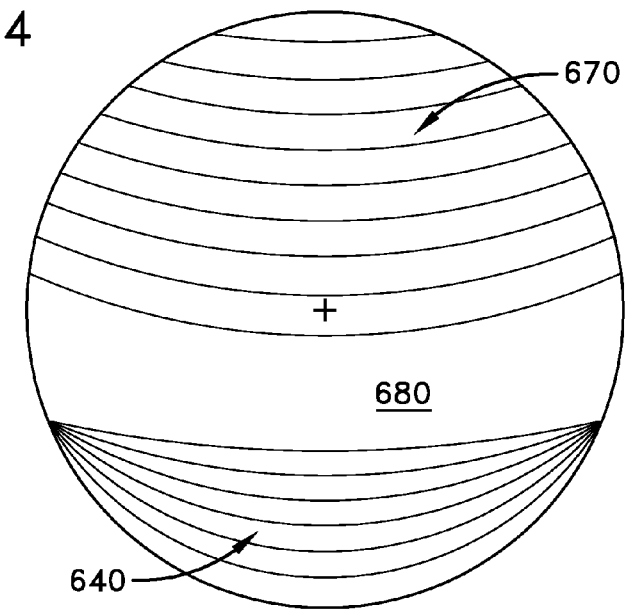
FIG. 15 is an alternative embodiment of a progressive contact lens having a progressive distance-viewing zone and a progressive near-viewing zone, the progressive distance-viewing zone having a crescent shape of parallel, curved segments, and the progressive near-viewing zone having a crescent shape of curved segments that converge at the periphery.

FIG. 15 is an alternative embodiment of a progressive contact lens 611 having a progressive distance-viewing zone 670 and a progressive near-viewing zone 640, the progressive distance-viewing zone having a crescent shape of parallel, curved segments, substantially as described for the embodiment shown in FIG. 13, and the progressive near-viewing zone having a crescent shape of segments that converge at the periphery, substantially as described for the embodiment shown in FIG. 9. An intermediate viewing zone 680 is disposed between the progressive distance-viewing zone 670 and the progressive near-viewing zone 640. The intermediate viewing zone 680 can be an intermediate viewing zone, having a desired optical power for intermediate viewing.

Figure 16:
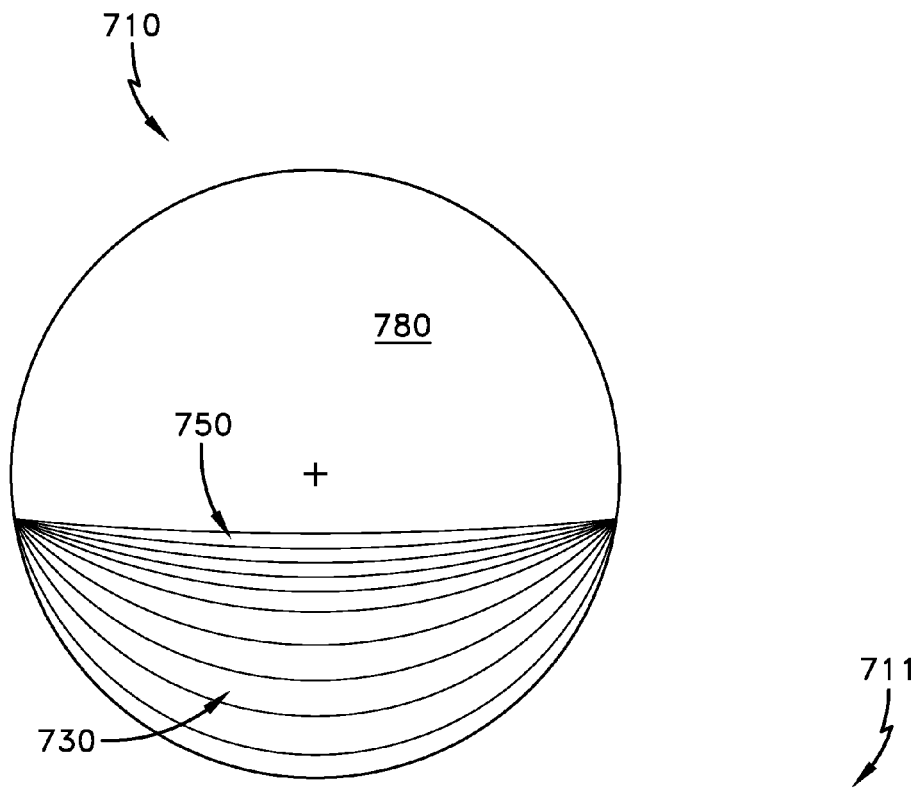
FIG. 16 is an embodiment of a progressive contact lens having a progressive near-viewing zone and a progressive intermediate-viewing zone, the progressive near-viewing zone having a crescent shape of curved segments that converge at the periphery, and the progressive intermediate-viewing zone having a crescent shape of curved segments that converge at the periphery.

FIG. 16 is an embodiment of a progressive contact lens 710 having a progressive near-viewing zone 730 and a progressive intermediate-viewing zone 750, disposed above, and typically adjacent, the progressive near-viewing zone. The progressive near-viewing zone 730 has a crescent shape of segments that converge at the periphery, substantially as described for the embodiment shown in FIG. 9, and the progressive intermediate-viewing zone 750 having a crescent shape of segments that converge at the periphery, substantially as described for the embodiment shown in FIG. 5. An upper viewing zone 780 is disposed above the progressive intermediate-viewing zone 750. The upper viewing zone 780 can be a distance viewing zone, having a desired optical power for distance viewing.

Figure 17:
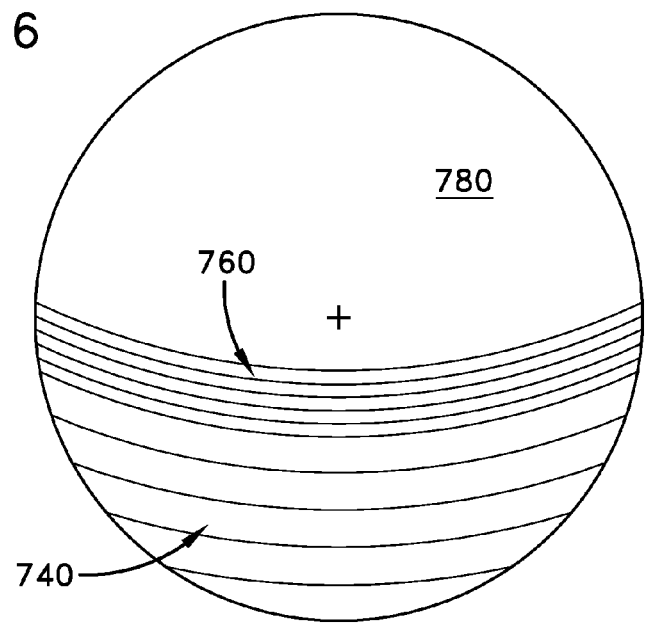
FIG. 17 is an alternative embodiment of a progressive contact lens having a progressive near-viewing zone and a progressive intermediate-viewing zone, the progressive near-viewing zone having a crescent shape of parallel, curved segments, and the progressive intermediate-viewing zone having a crescent shape of parallel, curved segments.

FIG. 17 is an alternative embodiment of a progressive contact lens 711 having a progressive near-viewing zone 740 and a progressive intermediate-viewing zone 760. The progressive near-viewing zone 740 has a crescent shape of parallel, curved segments, similar to or substantially as described for the embodiment shown in FIG. 10. The progressive intermediate-viewing zone 760 has a crescent shape of parallel, curved segments, similar to or substantially as described for the embodiment shown in FIG. 1. An upper viewing zone 780 is disposed above the progressive intermediate-viewing zone 760. The upper viewing zone 780 can be a distance viewing zone, having a desired optical power for distance viewing.

Figure 18:
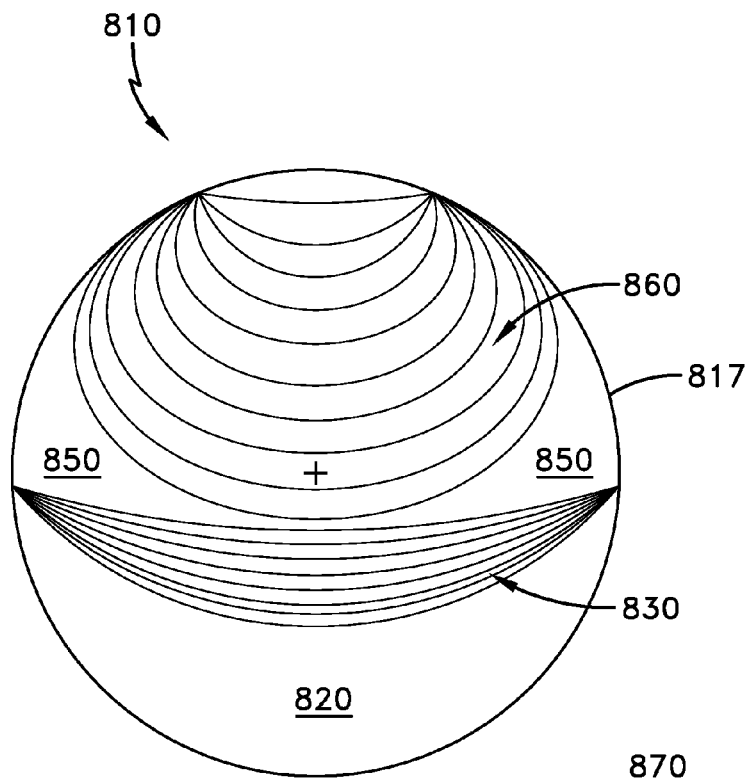
FIG. 18 is an embodiment of a progressive contact lens having a progressive distance-viewing zone and a progressive intermediate-viewing zone, the progressive distance-viewing zone having a crescent shape of curved segments that converge at the periphery, and the progressive intermediate-viewing zone having a crescent shape of curved segments that converge at the periphery.

FIG. 18 is an embodiment of a progressive contact lens 810 having a progressive distance-viewing zone 860 and a progressive intermediate-viewing zone 830. The progressive distance-viewing zone 860 has a crescent shape of curved segments that converge at the periphery 817, and is similar to or substantially as described for the embodiment shown in FIG. 12. The progressive intermediate-viewing zone 830 has a crescent shape of segments that converge at the periphery 817, and is similar or substantially as described for the embodiment shown in FIG. 5 or 7. A lower viewing zone 820 is disposed below the progressive intermediate-viewing zone 830. The lower viewing zone 820 can be a near viewing zone, having a desired optical power for near viewing.

Figure 19:
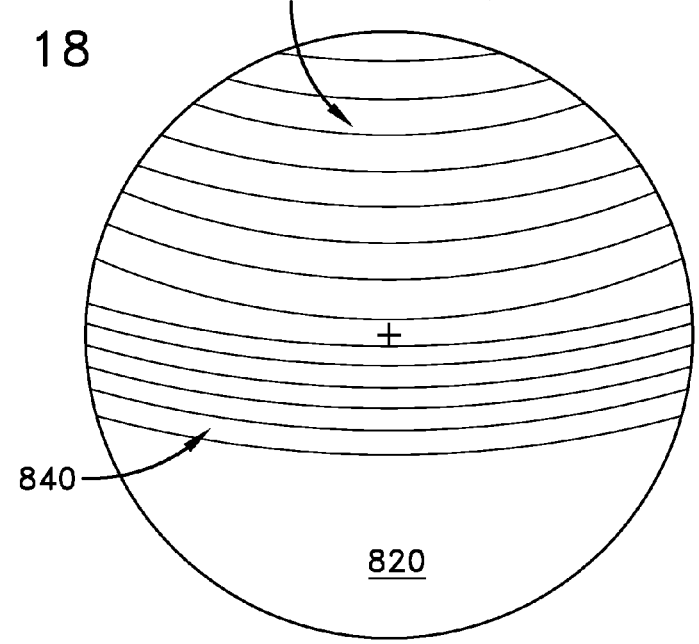
FIG. 19 is an alternative embodiment of a progressive contact lens having a progressive distance-viewing zone and a progressive intermediate-viewing zone, the progressive distance-viewing zone having a crescent shape of parallel, curved segments, and the progressive intermediate-viewing zone having a crescent shape of parallel, curved segments.

FIG. 19 is an alternative embodiment of a progressive contact lens 811 having a progressive distance-viewing zone 870 and a progressive intermediate-viewing zone 840. The progressive distance-viewing zone 870 has a crescent shape of parallel, curved segments, and is similar to or substantially as described for the embodiment shown in FIG. 13. The progressive intermediate-viewing zone 840 has a crescent shape of parallel, curved segments, and is similar to or substantially as described for the embodiment shown in FIG. 1. A lower viewing zone 820 is disposed below the progressive intermediate-viewing zone 840. The lower viewing zone 820 can be a near viewing zone, having a desired optical power for near viewing.

Figure 20:
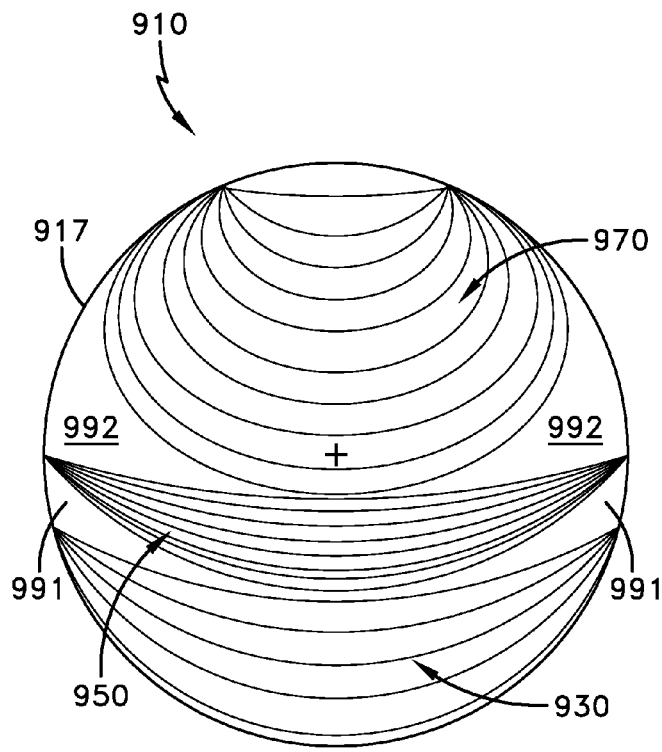
FIG. 20 is an embodiment of a progressive contact lens having a progressive distance-viewing zone, a progressive near-viewing zone, and a progressive intermediate-viewing zone, the progressive distance-viewing zone having a crescent shape of curved segments that converge at the periphery, the progressive near-viewing zone having a crescent shape of curved segments that converge at the periphery, and the progressive intermediate-viewing zone having a crescent shape of curved segments that converge at the periphery.

FIG. 20 is an embodiment of a progressive contact lens 910 having a progressive distance-viewing zone 970, a progressive near-viewing zone 930, and a progressive intermediate-viewing zone 950. The progressive distance-viewing zone 970 has a crescent shape of curved segments that converge at the periphery 917, and is similar to or substantially as described for the embodiment shown in FIG. 12. The progressive near-viewing zone 930 has a crescent shape of segments that converge at the periphery 917, and is similar to or substantially as described for the embodiment shown in FIG. 9. And the progressive intermediate-viewing zone 950 has a crescent shape of curved segments that converge at the periphery 917, and is similar to or substantially as described for the embodiment shown in FIG. 5 or 7.

First intermediate lateral viewing zones 991 are disposed b-laterally, adjacent the periphery 917, between the converging ends of the progressive intermediate-viewing zone 950, and the converging ends of the progressive near-viewing zone 930. Second intermediate lateral viewing zones 992 are disposed bi-laterally, adjacent the periphery 917, between the converging ends of the progressive intermediate-viewing zone 950, and the converging ends of the progressive distance-viewing zone 970. The first intermediate lateral viewing zones 991 can be either a near viewing zone or an intermediate viewing zone, having a desired optical power for near or intermediate viewing. The second intermediate lateral viewing zones 992 can be either an intermediate viewing zone or a distance viewing zone, having a desired optical power for intermediate or distance viewing.

Figure 21:
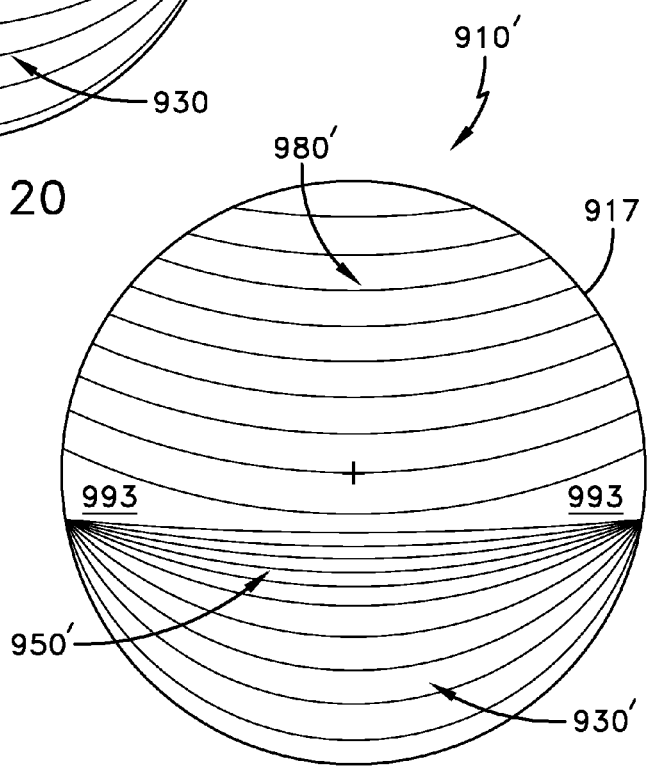
FIG. 21 is an embodiment of a progressive contact lens having a progressive distance-viewing zone, a progressive near-viewing zone, and a progressive intermediate-viewing zone, the progressive distance-viewing zone having a crescent shape of parallel, curved segments, the progressive near-viewing zone having a crescent shape of curved segments that converge at the periphery, and the progressive intermediate-viewing zone having a crescent shape of curved segments that converge at the periphery.

FIG. 21 is an embodiment of a progressive contact lens 910' having a progressive distance-viewing zone 980', a progressive near-viewing zone 930', and a progressive intermediate-viewing zone 950'. The progressive distance-viewing zone 980' has a crescent shape of parallel, curved segments, and is similar to or substantially as described for the embodiment shown in FIG. 13. The progressive near-viewing zone 930' has a crescent shape of segments that converge at the periphery 917, and is similar to or substantially as described for the embodiment shown in FIG. 9. And the progressive intermediate-viewing zone 950' has a crescent shape of curved segments that converge at the periphery 917, and is similar to or substantially as described for the embodiment shown in FIG. 5 or 7. First intermediate lateral viewing zones 993 are disposed b-laterally, adjacent the periphery 917, between the converging ends of the progressive intermediate-viewing zone 950', and the progressive distance-viewing zone 980'.

Figure 22:
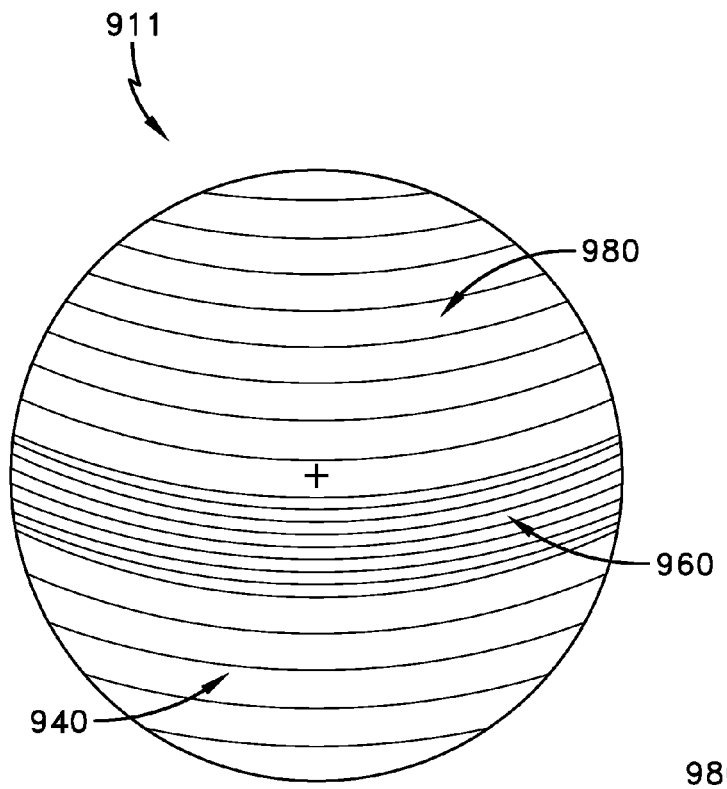
FIG. 22 is an alternative embodiment of a progressive contact lens having a progressive distance-viewing zone, a progressive near-viewing zone, and a progressive intermediate-viewing zone, the progressive distance-viewing zone having a crescent shape of parallel, curved segments, the progressive near-viewing zone having a crescent shape of parallel, curved segments, and the progressive intermediate-viewing zone having a crescent shape of parallel, curved segments.

FIG. 22 is an alternative embodiment of a progressive contact lens 911 having a progressive distance-viewing zone 980, a progressive near-viewing zone 940, and a progressive intermediate-viewing zone 960. The progressive distance-viewing zone 980 has a crescent shape of parallel, curved segments, and is similar to or substantially as described for the embodiment shown in FIG. 13. The progressive intermediate-viewing zone 960 having a crescent shape of parallel, curved segments, and is similar to or substantially as described for the embodiment shown in FIG. 1. The progressive near-viewing zone 940 having a crescent shape of concentric segments, and is similar to or substantially as described for the embodiment shown in FIG. 10.

Figure 23:
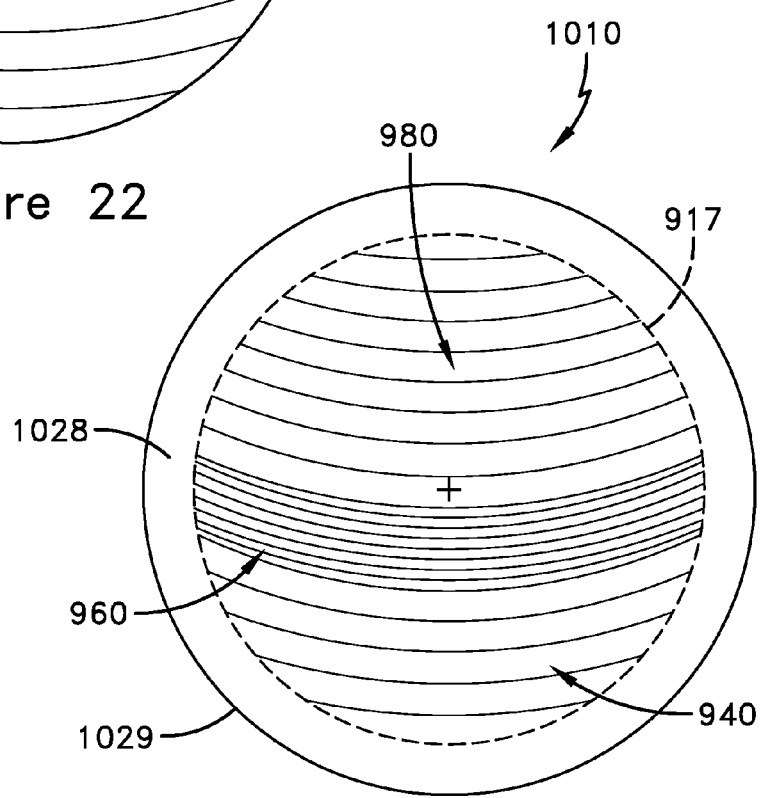
FIG. 23 illustrates an alternative embodiment of the progressive contact lens of FIG. 22, having an annular peripheral zone with a perimeter that extends beyond the focal areas of the lens.

FIG. 23 is an alternative embodiment of the progressive contact lens 1010, illustrating the contact lens 911 of FIG. 22, further having an annular peripheral zone 1028 having an outer perimeter 1029, which extends beyond the focal periphery 917 of the focal areas of the lens. Any of the embodiments of a contact lens described herein can further include an annular peripheral zone having a focal perimeter that extends beyond the periphery of the focal viewing zones or areas of the lens.

Manufacturing the Lens

The progressive or progressive multifocal contact lens can be manufactured using an oscillating tool lathe with computer controller such as the Precitech Optomform 40 with Variform Generator from Sterling of Tampa, Fla. or DAC Series IV/2 Axis ALM employing Oscillating Tool Technology (OTT), available from DAC International of Carpinteria, Calif. This type of lathe is programmed to generate a surface for the lens from a three-dimensional points file or a family of curve segments. The file can be based on any mathematical function that fulfills the requirements of a sigmoidal curve. A method of manufacturing a contact lens using a programmed lathe is described in U.S. Pat. No. 6,871,953 to Mandell, the disclosure of which is incorporated by reference.

In another embodiment of the invention, progressive or progressive multifocal contact lens can be manufactured using a molding process in which a concave molding surface of a mold portion is formed having a pattern that forms the one or more progressive viewing zones and other viewing zones onto a forward-facing outer surface of the molded contact lens. Non-limiting examples of molding process include those described in U.S. Pat. Nos. 4,640,489, 5,843, 346, 5,861,114, 6,582,631, and 7,799,249, the disclosures of which are incorporated by reference.

The principles that are described herein can be applied to lenses made of any optical material, hard, flexible, soft, hydrophobic or hydrophilic, that is suitable for a lens. Since the multifocal lens has a smooth surface it is possible to make a contact lens in which the multifocal surface is either on the front surface, back surface, or both surfaces.

I claim:

1. A progressive multifocal contact lens having a concave eye-contact surface and a convex forward-facing outer viewing surface having a focal periphery for receiving and bending light to the eye, the outer viewing surface consisting of an upper progressive distance-viewing zone having a curvature surface, adjacent to and disposed above a progressive intermediate-viewing zone, and a lower near-viewing zone having a curvature surface, adjacent to and disposed beneath the progressive intermediate-viewing zone; wherein the progressive intermediate-viewing zone has a crescent shape and including a plurality of progressive viewing segments, each progressive viewing segment having a crescent shape on the outer viewing surface and a curvature surface that progresses in curvature in a series, wherein each progressive viewing segment has a first lateral end and an opposite second lateral end, and the plurality of the first lateral ends and the second lateral ends, respectively, converge toward or at the focal periphery, and wherein the distance-viewing zone consists of a progressive distance-viewing zone comprising a plurality of progressive distance-viewing segments.

2. The progressive multifocal contact lens according to claim 1, wherein the progressive distance-viewing zone has a crescent shape, and includes a plurality of progressive distance-viewing segments, each progressive distance-viewing segment having a crescent shape on the outer viewing surface, and a curvature surface that progresses in curvature in a series.

3. The progressive multifocal contact lens according to claim 2, wherein each progressive distance-viewing segment has a first lateral end and an opposite second opposite lateral end, and the plurality of the first lateral ends and the second lateral ends, respectively, converge toward or at the focal periphery.

4. A progressive multi-focal contact lens, having a concave eye-contact surface and a convex forward-facing outer viewing surface having a focal periphery for receiving and bending light to the eye, the outer viewing surface comprising:
  i) an upper distance-viewing zone having a curvature surface and having a lower border with a convex shape,
  ii) a progressive intermediate-viewing zone having a crescent shape, having an upper border adjacent to and disposed below the upper distance-viewing zone, and a lower border, the progressive intermediate-viewing zone including a plurality of progressive intermediate-viewing segments, each progressive viewing segment having a crescent shape on the outer viewing surface and having a curvature surface that progresses in steeper curvature in a series from the upper border to the lower border of the progressive intermediate-viewing zone, where each progressive viewing segment has a first lateral end and an opposite second lateral end, and the plurality of the first lateral ends and the second lateral ends, respectively, converge toward or at the focal periphery, and
  iii) a lower near-viewing zone having a curvature surface, adjacent to and disposed beneath the lower border of the progressive intermediate-viewing zone, and having a concave shape along its border with the progressive intermediate-viewing zone.

5. The progressive multi-focal contact lens according to claim 4, where the plurality of progressive intermediate-viewing segments comprises at least two adjacent, progressive intermediate-viewing segments each have a first lateral end and an opposite second lateral end that converge toward or at the focal periphery.

6. The progressive multi-focal contact lens according to claim 4, where the plurality of progressive intermediate-viewing segments is three and more viewing segments.

7. The progressive multi-focal contact lens according to claim 6, where the plurality of progressive intermediate-viewing segments is at least 10, and up to 1000, viewing segments.

8. The progressive multi-focal contact lens according to claim 4, wherein the curvature of each progressive intermediate-viewing segment in the series of progressive intermediate-viewing segments has a curvature power, and each pair of adjacent progressive intermediate-viewing segments in the series of progressive intermediate-viewing segments differ in curvature power by a constant or a variable amount of 1.0 diopter and less.

9. The progressive multi-focal contact lens according to claim 8, wherein each pair of adjacent progressive intermediate-viewing segments differ in curvature power by a constant or a variable amount of 0.10 diopter and less.

10. The progressive multi-focal contact lens according to claim 9, wherein each pair of adjacent progressive intermediate-viewing segments differ in curvature power by a constant or a variable amount of 0.05 diopter and less.

11. The progressive multifocal contact lens according to claim 4, where the outer viewing surface has a center point, and the center point is disposed within the progressive intermediate-viewing zone.

12. The progressive multi-focal contact lens according to claim 4, wherein the lower near-viewing zone includes a progressive near-viewing zone that includes a plurality of progressive near-viewing segments having a curved shape on the outer viewing surface, and each progressive near-viewing segment having a curvature surface, wherein the plurality of said curvature surfaces progress in curvature in a series, and each progressive near-viewing segment has a first lateral end and an opposite second lateral end, and the plurality of the first lateral ends and the second lateral ends, respectively, converge toward or at the focal periphery.

13. The progressive multi-focal contact lens according to claim 4, wherein the upper distance viewing zone is a progressive distance-viewing zone including a plurality of progressive distance-viewing segments.

14. The progressive contact lens according to claim 4, further including an annular peripheral zone having an outer perimeter, wherein the annular peripheral zone extends beyond the focal periphery of the lens.

15. The progressive contact lens according to claim 4, wherein each adjacent pair of progressive intermediate-viewing segments of the plurality of progressive intermediate-viewing segments defines a crescent-shaped border therebetween that extends from the respective first lateral ends and the second lateral ends, to define a plurality of crescent-shaped borders, and wherein the plurality of the first lateral ends of the plurality of crescent-shaped borders converge toward or at a first lateral side of the focal periphery, and the plurality of the second lateral ends of the plurality of crescent-shaped borders converge toward or at a second lateral side of the focal periphery.

16. The progressive contact lens according to claim 4, wherein each adjacent pair of progressive intermediate-viewing segments of the plurality of progressive intermediate-viewing segments, progressing from the upper border to the lower border of the progressive intermediate-viewing zone, defines an upper segment and a lower segment that have a border consisting of a step that moves from the upper segment to the lower segment in a direction away from the forward-facing outer viewing surface.

* * * * *